J. T. SELL.
SAND-TRAPS FOR ARTESIAN OR DRIVEN WELLS, &c.
No. 195,051. Patented Sept. 11, 1877.
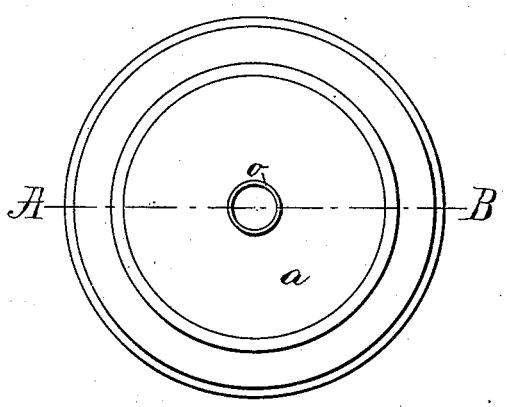
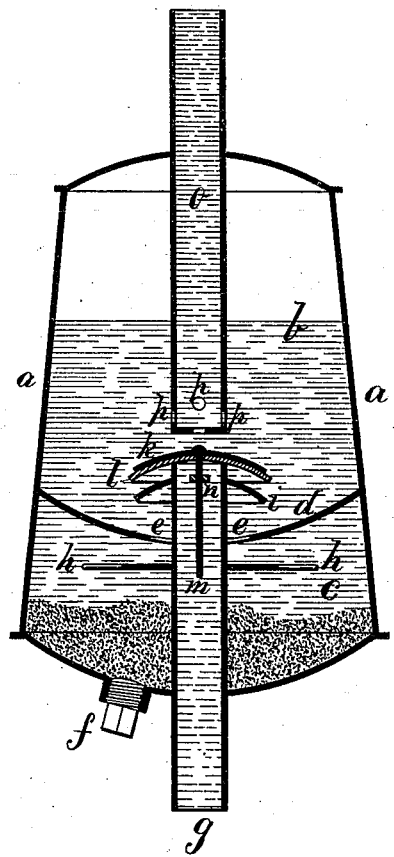
Witnesses:
H. Chadbourn
S. W. Chamberlin
Inventor:
James T. Sell
by
Alban Andrén
his atty.

UNITED STATES PATENT OFFICE.

JAMES T. SELL, OF CAMBRIDGEPORT, ASSIGNOR OF ONE-HALF HIS RIGHT TO MARTIN A. LATHROP, OF BOSTON, MASSACHUSETTS.

IMPROVEMENT IN SAND-TRAPS FOR ARTESIAN OR DRIVEN WELLS, &c.

Specification forming part of Letters Patent No. 195,051, dated September 11, 1877; application filed May 15, 1877.

*To all whom it may concern:*

Be it known that I, JAMES T. SELL, of Cambridgeport, in the county of Middlesex and State of Massachusetts, have invented certain new and useful Improvements in Sand-Traps; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in sand-traps for artesian or driven wells, or for other purposes where it is required to arrest sand, grit, and impurities, and to prevent it from entering the suction-pipe of the pump; and this my invention consists of a chamber, in combination with a pipe inserted from below up through a deflected division-wall, having an annular opening all round the said pipe. The upper end of said pipe is provided with a valve of a concave shape, which valve is provided with a central guide-pin, working in a guide in the interior of the aforesaid pipe. A little below the top of said pipe a downward-projecting bonnet is secured, the object of which is to force the sand and water drawn together from the well downward against the deflected division, when the heavier sand or gritty substances in the water fall down into the chamber below through the annular opening in said division-wall around the inlet-pipe. To the upper end of the chamber is secured the suction-pipe, that is perforated in its lower end, both in the bottom and on its sides. The extreme lower end of this pipe terminates a little above the top of the concave valve aforesaid, by which arrangement this lower end of the pipe is made to serve as a stop for said valve, to prevent it from being opened too far. A suitable screw-plug is inserted in a socket in the bottom of the sand-trap, which can easily be unscrewed, so as to let out the sandy or gritty accumulations from the lower portion of the chamber. The upper portion of the water-chamber serves as an air-chamber to equalize the flow of the water to the pump.

On the accompanying drawings, Figure 1 represents a plan view of my invention, and Fig. 2 represents a central longitudinal section on the line A B, shown in Fig. 1.

Similar letters refer to similar parts wherever they occur on the drawings.

$a$ represents the annular chamber, consisting of the upper air and water chamber $b$ and lower sand-receptacle $c$. $d$ represents the deflected division-wall between the chambers $b$ and $c$, which division-wall is provided with an annular opening, $e$ $e$, as shown. $f$ is the gate or plug in the bottom of the sand-receptacle $c$, through which the impurities are removed from said receptacle. $g$ represents the inlet-pipe secured to the bottom of the sand-receptacle, which pipe is further secured to the inside of the chamber $c$ by means of the arms or supports $h$ $h$. Near the upper end of the inlet-pipe $g$ is secured a convex bonnet, $i$, as shown in Fig. 2. The top of the pipe $g$ is covered by a concave valve, $k$, provided on its under side with a suitable packing, $l$, and having a guide-rod, $m$, movable in a suitable guide, $n$, in the pipe $g$. $o$ represents the suction-pipe leading from the pump, the lower end of which pipe is provided with perforations $p$ $p$ $p$, both on the sides and on the very bottom, as shown. The lower end of said pipe also serves as a stop to prevent the valve $k$ from rising too far upward from its seat.

The operation of the invention is as follows: When the water is drawn from the well it rises up through the pipe $g$, and, striking the under side of the concave valve $k$, it is forced downward between said valve and its bonnet $i$, against the deflected division-wall $d$, and the sand, grit, &c., being heavier than the liquid, sinks downward through the opening $e$ $e$ into the sand-chamber $c$, from which it can easily be withdrawn through the stop-cock $f$, as occasion requires. The clear liquid enters the chamber $b$, leaving an air-space above the liquid, as shown, and the liquid is easily pumped from the chamber $b$ free from grit, sand, &c. When the pump ceases to act the valve $k$ sinks onto its seat, and thus serves as a check-valve to prevent the escape of the liquid from the chamber $b$.

Having thus fully described the nature, construction, and operation of my invention, I wish to secure by Letters Patent and claim—

The combination and arrangement of the receptacle $a$, inlet-pipe $g$ with its deflected bonnet $i$ and valve $k$, the deflected division-wall $d$ with its annular opening $e\ e$, and the suction-pipe $o$ with its side openings $p\ p\ p$, all arranged and combined substantially as and for the purpose herein set forth and described.

In testimony that I claim the foregoing as my own invention I have affixed my signature in presence of two witnesses.

JAMES T. SELL.

Witnesses:
ALBAN ANDRÉN,
HENRY CHADBOURN.